United States Patent
Jiang et al.

(10) Patent No.: US 9,465,992 B2
(45) Date of Patent: Oct. 11, 2016

(54) SCENE RECOGNITION METHOD AND APPARATUS

(71) Applicant: Huawei Technologies Co., Ltd., Shenzhen (CN)

(72) Inventors: Yugang Jiang, Shanghai (CN); Jie Liu, Shenzhen (CN); Dong Wang, Shenzhen (CN); Yingbin Zheng, Shanghai (CN); Xiangyang Xue, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/657,121

(22) Filed: Mar. 13, 2015

(65) Prior Publication Data

US 2015/0186726 A1 Jul. 2, 2015

Related U.S. Application Data

(63) Continuation of application No. PCT/CN2013/083501, filed on Sep. 13, 2013.

(30) Foreign Application Priority Data

Sep. 14, 2012 (CN) .......................... 2012 1 0341511

(51) Int. Cl.
*G06K 9/46* (2006.01)
*G06K 9/00* (2006.01)
*G06K 9/62* (2006.01)

(52) U.S. Cl.
CPC ....... *G06K 9/00624* (2013.01); *G06K 9/00684* (2013.01); *G06K 9/629* (2013.01)

(58) Field of Classification Search
CPC ............. G06K 9/00624; G06K 9/629; G06K 9/00684

USPC ......................................................... 382/195
See application file for complete search history.

(56) References Cited

U.S. PATENT DOCUMENTS

| 6,549,660 B1 | 4/2003 | Lipson et al. |
| 2008/0199079 A1 | 8/2008 | Kasai et al. |

(Continued)

FOREIGN PATENT DOCUMENTS

| CN | 101127029 A | 2/2008 |
| CN | 101277394 A | 10/2008 |

(Continued)

OTHER PUBLICATIONS

Felzenszwalb et al: "Object Detection with Discriminatively Trained Part-Based Models", IEEE, 2010.*

(Continued)

*Primary Examiner* — Ruiping Li
(74) *Attorney, Agent, or Firm* — Conley Rose, P.C.; Grant Rodolph; Nicholas K. Beaulieu (57) ABSTRACT

A scene recognition method and apparatus are provided. The method includes obtaining multiple local detectors by training a training image set, where one local detector in the multiple local detectors corresponds to one local area of a type of target, and the type of target includes at least two local areas; detecting a to-be-recognized scene by using the multiple local detectors, and acquiring a feature, which is based on a local area of the target, of the to-be-recognized scene; and recognizing the to-be-recognized scene according to the feature, which is based on the local area of the target, of the to-be-recognized scene.

13 Claims, 6 Drawing Sheets

(56) References Cited

U.S. PATENT DOCUMENTS

| | | |
|---|---|---|
| 2010/0142807 A1 | 6/2010 | Yasuda et al. |
| 2012/0213426 A1 | 8/2012 | Fei-Fei et al. |

FOREIGN PATENT DOCUMENTS

| | | | |
|---|---|---|---|
| CN | 101650783 | A | 2/2010 |
| CN | 101968884 | A | 2/2011 |
| CN | 101996317 | A | 3/2011 |
| CN | 102426653 | A | 4/2012 |
| EP | 2154630 | A1 | 2/2010 |
| WO | 2011110960 | A1 | 9/2011 |

OTHER PUBLICATIONS

Partial English Translation and Abstract of Chinese Patent Application No. CN101996317A, Apr. 2, 2015, 5 pages.

Partial English Translation and Abstract of Chinese Patent Application No. CN102426653A, Apr. 2, 2015, 5 pages.

Foreign Communication From a Counterpart Application, PCT Application No. PCT/CN2013/083501, English Translation of International Search Report dated Dec. 19, 2013, 2 pages.

Foreign Communication From a Counterpart Application, PCT Application No. PCT/CN2013/083501, English Translation of Written Opinion dated Dec. 19, 2013, 5 pages.

Foreign Communication From a Counterpart Application, European Application No. 13837155.4, Extended European Search Report dated Sep. 18, 2015, 5 pages.

Foreign Communication From a Counterpart Application, Chinese Application No. 201210341511.0, Chinese Search Report dated Apr. 7, 2016, 2 pages.

Foreign Communication From a Counterpart Application, Chinese Application No. 201210341511.0, Chinese Office Action dated Apr. 25, 2016, 4 pages.

* cited by examiner

SCENE RECOGNITION METHOD AND APPARATUS

CROSS-REFERENCE TO RELATED APPLICATIONS

This application is a continuation of International Application No. PCT/CN2013/083501, filed on Sep. 13, 2013, which claims priority to Chinese Patent Application No. 201210341511.0, filed on Sep. 14, 2012, which are both incorporated herein by reference in their entirety.

TECHNICAL FIELD

The present invention relates to the field of information technologies, and more specifically, to a scene recognition method and apparatus.

BACKGROUND

Image scene recognition refers to using visual information of an image to automatically process and analyze the image, and determine and recognize a particular scene (for example, a kitchen, a street, or a mountain) in the image. Determining a scene in an image not only contributes to understanding of overall semantic content of the image but also provides a basis for recognizing a specific target and event in the image. Therefore, scene recognition plays an important role in automatic image understanding by a computer. A scene recognition technology may be applied to many practical problems, such as intelligent image management and retrieval.

In an existing scene recognition technology, visual information of an image is first described, and this process is also referred to as visual feature extraction of the image; then, matching (or classification) is performed on an extracted visual feature by using a template (or a classifier) that is aimed at a different scene and has been acquired, and a final scene recognition result is acquired.

A general method for extracting visual features is calculating statistics that represent low-level visual information in an image. These visual features include a feature that describes color information, a feature that describes texture information, a feature that describes shape information, and the like. After the low-level visual information is obtained, the features can be classified by using a classifier trained beforehand, and then a final recognition result is obtained. A main drawback of this method is that a low-level visual feature is incompetent in distinguishing different scenes, and some scenes (for example, a study room and a library) with similar information such as color and texture cannot be effectively distinguished or recognized, thereby affecting scene recognition performance.

In another existing method, a middle-level feature representation (or referred to as an "attribute") is used to perform scene recognition. For such a method, a large number of visual concept detectors need to be designed first. Results obtained by means of detection by the visual concept detectors are concatenated to form a middle-level feature representation. Finally, the feature is classified by using a classifier, and then a final recognition result is obtained. Main drawbacks of this method include: 1. in this method, a detection result (for example, an "athlete" and a "football") of a whole target of a labeled object is used as a middle-level feature, which has a limited description capability, and if only a part of an object is present in a scene (for example, "only a leg of an athlete is shown"), the object cannot be detected; and 2. repetition may exist in a detector set, that is, one detector is trained for each type of object that is labeled by each training image set; because meanings of some types of images may be similar (for example, a "referee" and an "athlete"), detectors obtained by training these types are repetitive or highly similar; on the one hand, a high-dimensional disaster of feature information is caused, and on the other hand, a result that is repeatedly obtained by means of detection for multiple times relatively suppresses a detection result that is rarely present, thereby affecting scene recognition performance.

SUMMARY

Embodiments of the present invention provide a scene recognition method and apparatus, which can improve scene recognition performance.

According to a first aspect, a scene recognition method is provided, where the method includes obtaining multiple local detectors by training a training image set, where one local detector in the multiple local detectors corresponds to one local area of a type of target, and the type of target includes at least two local areas; detecting a to-be-recognized scene by using the multiple local detectors, and acquiring a feature, which is based on a local area of the target, of the to-be-recognized scene; and recognizing the to-be-recognized scene according to the feature, which is based on the local area of the target, of the to-be-recognized scene.

In a first possible implementation manner, the method further includes combining local detectors whose similarity is higher than a predetermined threshold in the multiple local detectors, to obtain a set in which local detectors are combined; and the detecting a to-be-recognized scene by using the multiple local detectors, and acquiring a feature, which is based on a local area of the target, of the to-be-recognized scene is implemented as detecting the to-be-recognized scene by using a local detector in the set in which the local detectors are combined, and acquiring the feature, which is based on the local area of the target, of the to-be-recognized scene.

With reference to the first possible implementation manner of the first aspect, in a second possible implementation manner, the similarity includes a similarity degree between features of local areas of training images corresponding to the multiple local detectors.

With reference to the first aspect or the first or second possible implementation manner of the first aspect, in a third possible implementation manner, the recognizing the to-be-recognized scene according to the feature, which is based on the local area of the target, of the to-be-recognized scene is implemented as classifying the feature, which is based on the local area of the target, of the to-be-recognized scene by using a classifier, and acquiring a scene recognition result.

With reference to the first aspect or the first, second, or third possible implementation manner of the first aspect, in a fourth possible implementation manner, the acquiring a feature, which is based on a local area of the target, of the to-be-recognized scene is implemented as acquiring a response diagram of the to-be-recognized scene by using each local detector that detects the to-be-recognized scene; and dividing the response diagram into multiple grids, using a maximum response value in each grid as a feature of each grid, using features of all grids of the response diagram as features corresponding to the response diagram, and using features that correspond to the response diagram and are acquired by all local detectors that detect the to-be-recognized scene as the feature, which is based on the local area of the target, of the to-be-recognized scene.

According to a second aspect, a scene recognition apparatus is provided, where the apparatus includes a generating module configured to obtain multiple local detectors by training a training image set, where one local detector in the multiple local detectors corresponds to one local area of a type of target, and the type of target includes at least two local areas; a detecting module configured to detect a to-be-recognized scene by using the multiple local detectors that are obtained by the generating module, and acquire a feature, which is based on a local area of the target, of the to-be-recognized scene; and a recognizing module configured to recognize the to-be-recognized scene according to the feature, which is based on the local area of the target and acquired by the detecting module, of the to-be-recognized scene.

In a first possible implementation manner, the apparatus further includes a combining module configured to combine local detectors whose similarity is higher than a predetermined threshold in the multiple local detectors, to obtain a set in which local detectors are combined; where the detecting module is further configured to detect the to-be-recognized scene by using a local detector in the set in which the local detectors are combined, and acquire the feature, which is based on the local area of the target, of the to-be-recognized scene.

With reference to the first possible implementation manner of the second aspect, in a second possible implementation manner, the similarity includes a similarity degree between features of local areas of training images corresponding to the multiple local detectors.

With reference to the second aspect or the first or second possible implementation manner of the second aspect, in a third possible implementation manner, the recognizing module is configured to classify the feature, which is based on the local area of the target, of the to-be-recognized scene by using a classifier, and acquire a scene recognition result.

With reference to the second aspect or the first, second, or third possible implementation manner of the second aspect, in a fourth possible implementation manner, the detecting module is configured to acquire a response diagram of the to-be-recognized scene by using each local detector that detects the to-be-recognized scene, divide the response diagram into multiple grids, use a maximum response value in each grid as a feature of each grid, use features of all grids of the response diagram as features corresponding to the response diagram, and use features that correspond to the response diagram and are acquired by all local detectors that detect the to-be-recognized scene as the feature, which is based on the local area of the target, of the to-be-recognized scene.

Based on the foregoing technical solutions, according to the scene recognition method and apparatus in the embodiments of the present invention, a to-be-recognized scene is detected by using a local detector corresponding to a local area of a target, and an acquired feature, which is based on the local area of the target, of the to-be-recognized scene may represent image information more completely, so that scene recognition performance can be improved.

BRIEF DESCRIPTION OF THE DRAWINGS

To describe the technical solutions in the embodiments of the present invention more clearly, the following briefly introduces the accompanying drawings required for describing the embodiments. The accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. The described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
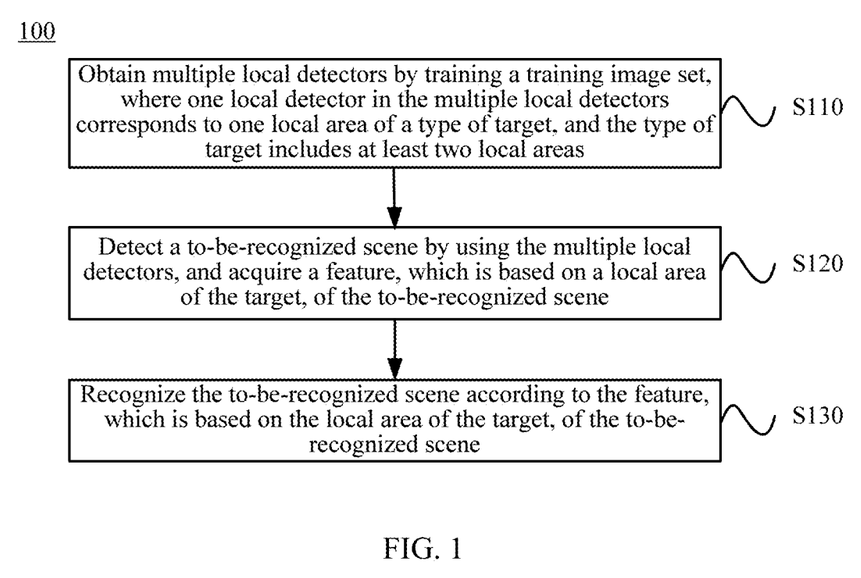
FIG. 1 is a schematic flowchart of a scene recognition method according to an embodiment of the present invention.

FIG. 1 is a schematic flowchart of a scene recognition method 100 according to an embodiment of the present invention. As shown in FIG. 1, the method 100 includes the following steps.

S110. Obtain multiple local detectors by training a training image set, where one local detector in the multiple local detectors corresponds to one local area of a type of target, and the type of target includes at least two local areas.

S120. Detect a to-be-recognized scene by using the multiple local detectors, and acquire a feature, which is based on a local area of the target, of the to-be-recognized scene.

S130. Recognize the to-be-recognized scene according to the feature, which is based on the local area of the target, of the to-be-recognized scene.

When only a local area of a target is present, a detector corresponding to the whole target cannot detect a feature of the local area of the target, thereby affecting scene recognition performance. In this embodiment of the present invention, a scene recognition apparatus first obtains multiple local detectors by training a training image set, where one local detector corresponds to one local area of a type of target; then, detects a to-be-recognized scene by using the multiple local detectors, acquires a feature, which is based on a local area of the target, of the to-be-recognized scene; and then recognizes the to-be-recognized scene according to the feature, which is based on the local area of the target, of the to-be-recognized scene. Because a local detector corresponds to a local area of a target, detecting a scene by using a local detector can obtain a feature of a local area of a target.

Therefore, according to the scene recognition method in this embodiment of the present invention, a to-be-recognized scene is detected by using a local detector corresponding to a local area of a target, and an acquired feature, which is based on the local area of the target, of the to-be-recognized scene may represent image information more completely, so that scene recognition performance can be improved.

In S110, a scene recognition apparatus obtains multiple local detectors by training a training image set.

In this embodiment of the present invention, each type of target is divided into multiple local areas, that is, each type of target includes at least two local areas. To generate a local detector, a training image set with a label needs to be used, where the label not only needs to have a target category (for example, a "referee") that an image has, but also needs to have specific position information of a whole target in the image (a position of each part of the target is not required). Generally, 100 or more samples are required for each type of target. Based on labeled samples, a local detector for each type of target may be obtained by using an existing deformable part-based models (DPM) algorithm. The DPM algorithm automatically identifies several most unique parts (such as the "head", the "body", and the "lower limb" of a "referee") in each type of target according to an input parameter (for example, the number of parts), so as to obtain local detectors corresponding to the several parts.

In S120, the scene recognition apparatus detects a to-be-recognized scene by using the multiple local detectors, and acquires a feature, which is based on a local area of a target, of the to-be-recognized scene.

Figure 2:
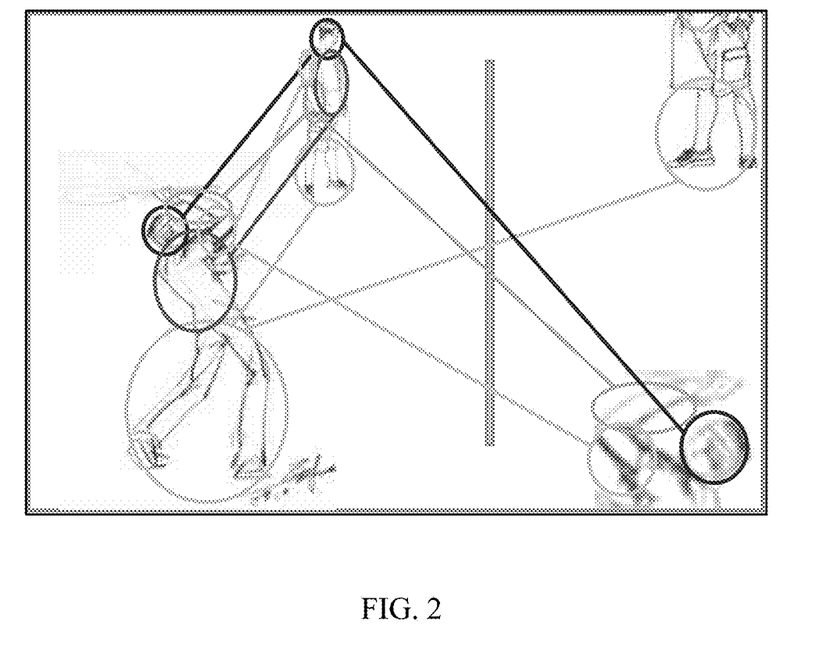
FIG. 2 is a schematic diagram of an example of a scene recognition method according to an embodiment of the present invention.

After local detectors are generated, the scene recognition apparatus detects a to-be-recognized scene by using these local detectors, and obtains features of local areas corresponding to the local detectors; and the features of these local areas form a feature, which is based on a local area of a target, of the to-be-recognized scene. As shown in FIG. 2, an image is detected by using local detectors corresponding to different parts (for example, the head, the body, an upper arm, a lower arm, and a leg) of a person, and features of different parts of each target (a person shown in FIG. 2) are obtained, so as to form a feature, which is based on the different parts of the person, of a whole image scene.

Figure 3:
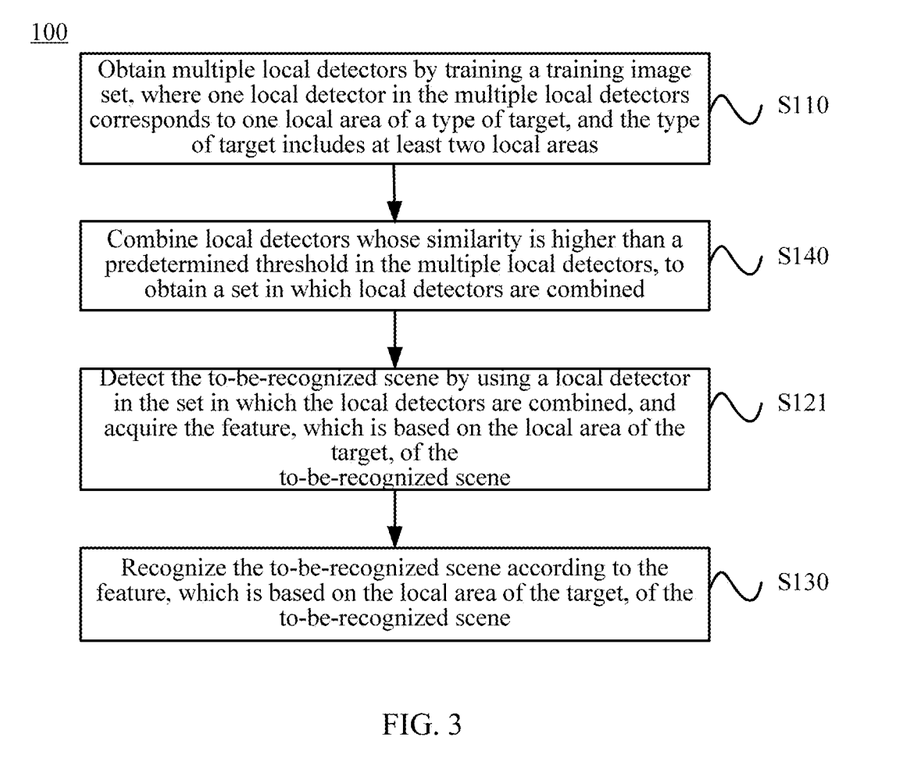
FIG. 3 is another schematic flowchart of a scene recognition method according to an embodiment of the present invention.

In this embodiment of the present invention, as shown in FIG. 3, optionally, the method 100 further includes the following step.

S140. Combine local detectors whose similarity is higher than a predetermined threshold in the multiple local detectors, to obtain a set in which local detectors are combined.

Correspondingly, step S120 includes the following step.

S121. Detect the to-be-recognized scene by using a local detector in the set in which the local detectors are combined, and acquire the feature, which is based on the local area of the target, of the to-be-recognized scene.

Different types of targets may have local areas with a common character, for example, the head of an athlete and the head of a referee. To avoid repeated detection on a part, local detectors whose similarity is relatively high in multiple local detectors may be combined, that is, local detectors whose similarity is higher than a predetermined threshold are combined; and then, a to-be-recognized scene is detected by using a combined local detector.

In this embodiment of the present invention, the set in which the local detectors are combined represents a local detector set obtained after the multiple local detectors are combined; if a part of local detectors are combined, the set in which the local detectors are combined includes a combined local detector and the other part of local detectors that are not combined; and if all the local detectors are combined, the set in which the local detectors are combined includes only a combined local detector.

Combination of local detectors may be based on information about local areas of a corresponding image. Optionally, a limitation may be imposed on semantics of areas to be combined, so as to ensure that a combined local detector is highly relevant in terms of semantics. For example, the "head" of a "referee" and the "head" of an "athlete" may be combined, but are not allowed to be combined with the "head" of a "cat".

Optionally, a similarity between local detectors includes a similarity degree between features of local areas of training images corresponding to the local detectors. For example, for each local detector in a set in which local detectors that are to be combined, an image local area corresponding to each local detector is found in a training image corresponding to each local detector, and a similarity of each local detector is obtained according to a similarity degree of a low-level feature (such as a color and a texture) of a local training image corresponding to each local detector. Local detectors whose similarity is relatively high, that is, higher than the predetermined threshold (for example, 0.8), may be combined. A combination manner may be a simple upper left corner alignment and averaging manner, that is, averaging is performed after filtering matrices corresponding to local detectors that need to be combined are aligned along the upper left corner.

Figure 4:
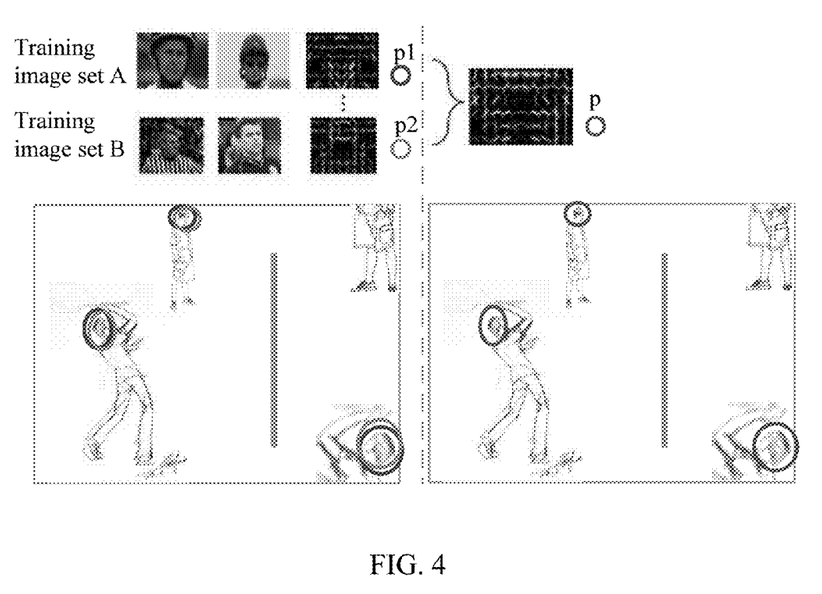
FIG. 4 is a schematic diagram of another example of a scene recognition method according to an embodiment of the present invention.

As shown in FIG. 4, a local detector p1 is obtained by training a training image set A, a local detector p2 is obtained by training a training image set B, both p1 and p2 correspond to heads, and a local detector p is obtained by combining p1 and p2. If p1 and p2 are used to perform detection, each target is detected twice; however, if the combined local detector p is used to perform detection, each target is detected only once, thereby avoiding repeated detection.

Therefore, according to the scene recognition method in this embodiment of the present invention, local detectors are combined, and a to-be-recognized scene is detected by using a combined local detector, so that an acquired feature of the to-be-recognized scene can completely represent image information, and repeated detection on a part can also be avoided, thereby effectively reducing the number of dimensions of feature information, so that scene recognition performance can be improved.

In this embodiment of the present invention, optionally, acquiring the feature, which is based on the local area of the target, of the to-be-recognized scene includes acquiring a response diagram of the to-be-recognized scene by using each local detector that detects the to-be-recognized scene; and dividing the response diagram into multiple grids, using a maximum response value in each grid as a feature of each grid, using features of all grids of the response diagram as features corresponding to the response diagram, and using features that correspond to the response diagram and are acquired by all local detectors that detect the to-be-recognized scene as the feature, which is based on the local area of the target, of the to-be-recognized scene.

Figure 5:
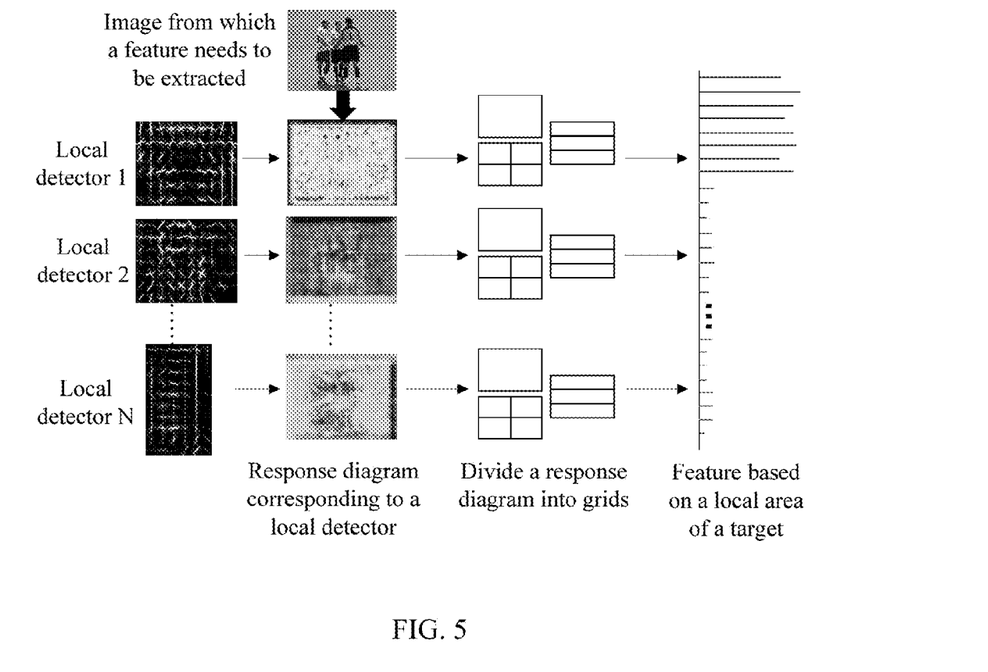
FIG. 5 is still another schematic flowchart of a scene recognition method according to an embodiment of the present invention.

An image is given, and for each local detector, if local detectors are combined, a combined local detector generates a response diagram, which is aimed at the local detector, in the image by using a method of sliding a window in the image. As shown in FIG. 5, each local detector in a local detector 1 to a local detector N separately detects an image from which a feature needs to be extracted, that is, an image of a to-be-recognized scene. Each local detector generates a response diagram. Optionally, the response diagram generated by each local detector may be divided into grids in three manners (1*1, 3*1, and 2*2). For each grid obtained after grid division, a maximum response value in the grid is used as a feature of the grid; in this way, each local detector may generate a response feature with eight dimensions (1*1+3*1+2*2). Features generated by all local detectors may be concatenated/combined to obtain a final feature, that is, the feature, which is based on the local area of the target, of the to-be-recognized scene. It is assumed that the number of local detectors is N, and then the number of dimensions of a finally generated feature of the local areas is 8N. It should be noted that, the example shown in FIG. 5 is merely intended to help a person skilled in the art better understand this embodiment of the present invention, instead of limiting the scope of this embodiment of the present invention.

Optionally, multi-scale transform may further be performed on the image, and the foregoing features are calculated separately. For example, an input image is scaled down by a half or scaled up double to obtain two images in different scales. Features are calculated on the two images by using the same method, to obtain a feature with 8N dimensions from each image. Combined with features of the original image, a total number of feature description dimensions is 3*8*N. Using multi-scale images makes a final feature be more robust for scale transform of a part of a target.

In S130, the scene recognition apparatus recognizes the to-be-recognized scene according to the feature, which is based on the local area of the target, of the to-be-recognized scene.

After obtaining the feature, which is based on the local area of the target, of the to-be-recognized scene, the scene recognition apparatus recognizes the scene according to the feature. Optionally, S130 includes classifying the feature, which is based on the local area of the target, of the to-be-recognized scene by using a classifier, and acquiring a scene recognition result.

A classifier needs to be first trained for a scene category according to the feature based on the local area of the target in this embodiment of the present invention. For example, a Support Vector Machines (SVM) classifier of a linear kernel function may be used. A scene category is given. First, training samples of the scene and a whole label of an image, that is, whether the scene is included, need to be collected, and a feature provided in this embodiment of the present invention, that is, a feature based on a local area of a target, is extracted; then, an SVM classifier of a linear kernel function is trained by using these training samples. If there are multiple scene categories, multiple classifiers are trained. A new image is given. A trained scene classifier is used to classify a feature, which is based on a local area of a target, of the image scene, and output is a recognition confidence level of a scene corresponding to the classifier, where if the recognition confidence level is high, a to-be-recognized scene is similar to the scene corresponding to the classifier, so as to obtain a scene recognition result.

Therefore, according to the scene recognition method in this embodiment of the present invention, a to-be-recognized scene is detected by using a local detector corresponding to a local area of a target, and an acquired feature, which is based on the local area of the target, of the to-be-recognized scene may represent image information more completely; further, local detectors are combined, and the to-be-recognized scene is detected by using a combined local detector, so that the acquired feature of the to-be-recognized scene can completely represent image information, and repeated detection on a part can also be avoided, thereby effectively reducing the number of dimensions of feature information, so that scene recognition performance can be improved.

It should be understood that sequence numbers of the foregoing processes do not mean execution sequences in various embodiments of the present invention. The execution sequences of the processes should be determined according to functions and internal logic of the processes, but should not be construed as any limitation on the implementation processes of the embodiments of the present invention.

The scene recognition methods according to the embodiments of the present invention are described in the foregoing in detail with reference to FIG. 1 to FIG. 5. Scene recognition apparatuses according to embodiments of the present invention are described in the following with reference to FIG. 6 to FIG. 8.

Figure 6:
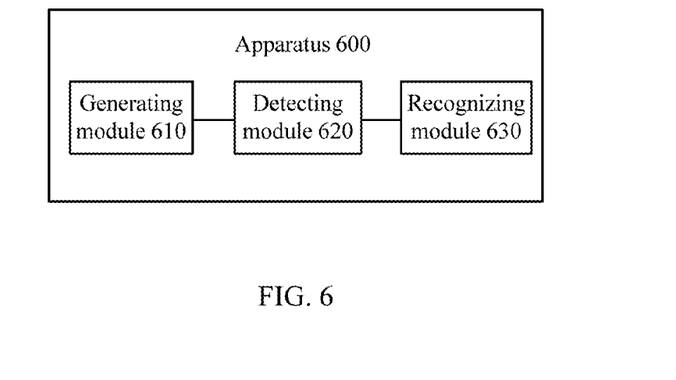
FIG. 6 is a schematic block diagram of a scene recognition apparatus according to an embodiment of the present invention.

FIG. 6 is a schematic block diagram of a scene recognition apparatus 600 according to an embodiment of the present invention. As shown in FIG. 6, the apparatus 600 includes a generating module 610 configured to obtain multiple local detectors by training a training image set, where one local detector in the multiple local detectors corresponds to one local area of a type of target, and the type of target includes at least two local areas; a detecting module 620 configured to detect a to-be-recognized scene by using the multiple local detectors that are obtained by the generating module 610, and acquire a feature, which is based on a local area of the target, of the to-be-recognized scene; and a recognizing module 630 configured to recognize the to-be-recognized scene according to the feature, which is based on the local area of the target and acquired by the detecting module 620, of the to-be-recognized scene.

In this embodiment of the present invention, first, the generating module 610 obtains multiple local detectors by training a training image set, where one local detector corresponds to one local area of a type of target; then, the detecting module 620 detects a to-be-recognized scene by using the multiple local detectors, and acquires a feature, which is based on a local area of the target, of the to-be-recognized scene; and then, the recognizing module 630 recognizes the to-be-recognized scene according to the feature, which is based on the local area of the target, of the to-be-recognized scene. Because a local detector corresponds to a local area of a target, detecting a scene by using a local detector can obtain a feature of a local area of a target.

Therefore, according to the scene recognition apparatus in this embodiment of the present invention, a to-be-recognized scene is detected by using a local detector corresponding to a local area of a target, and an acquired feature, which is based on the local area of the target, of the to-be-recognized scene may represent image information more completely, so that scene recognition performance can be improved.

The generating module 610 uses a training image set with a label, where the label not only needs to have a target category (for example, a "referee") that an image has, but also needs to have specific position information of a whole target in the image (a position of each part of the target is not required). Generally, 100 or more samples are required for each type of target. Based on labeled samples, a local detector for each type of target is obtained by using an existing DPM algorithm. The DPM algorithm automatically identifies several most unique parts (such as the "head", the "body", and the "lower limb" of a "referee") in each type of target according to an input parameter (for example, the number of parts), so as to obtain local detectors corresponding to the several parts.

The detecting module 620 detects a to-be-recognized scene by using these local detectors, and obtains features of local areas corresponding to the local detectors; and these features of the local areas form a feature, which is based on a local area of the target, of the to-be-recognized scene. For example, as shown in FIG. 2, an image is detected by using local detectors corresponding to different parts (for example, the head, the body, an upper arm, a lower arm, and a leg) of a person, and features of different parts of each target (a person shown in FIG. 2) are obtained, so as to form a feature, which is based on the different parts of the person, of a whole image scene.

Figure 7:
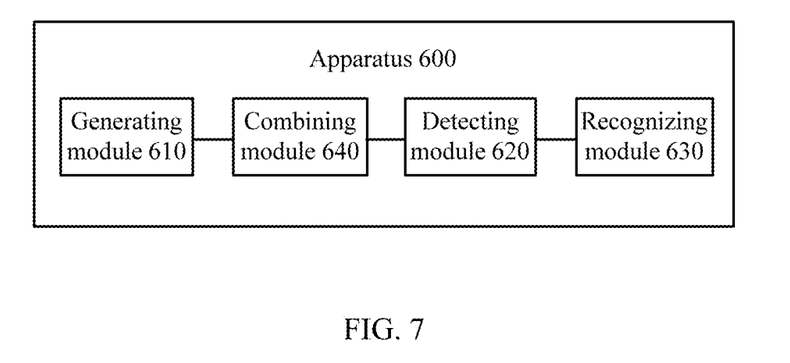
FIG. 7 is another schematic block diagram of a scene recognition apparatus according to an embodiment of the present invention.

In this embodiment of the present invention, as shown in FIG. 7, optionally, the apparatus 600 further includes a combining module 640 configured to combine local detectors whose similarity is higher than a predetermined threshold in the multiple local detectors, to obtain a set in which local detectors are combined; where the detecting module 620 is further configured to detect the to-be-recognized scene by using a local detector in the set in which the local detectors are combined, and acquire the feature, which is based on the local area of the target, of the to-be-recognized scene.

Different types of targets may have local areas with a common character, for example, the head of an athlete and the head of a referee. To avoid repeated detection on a part, the combining module 640 combines local detectors whose similarity is relatively high in multiple local detectors, that is, combines local detectors whose similarity is higher than a predetermined threshold; and then, the detecting module 620 detects a to-be-recognized scene by using a combined local detector.

In this embodiment of the present invention, optionally, the similarity includes a similarity degree between features of local areas of training images corresponding to the multiple local detectors.

For example, for each local detector in a set in which local detectors that are to be combined, an image local area corresponding to each local detector is found in a training image corresponding to each local detector, and a similarity of each local detector is obtained according to a similarity degree of a low-level feature (such as a color and a texture) of a local training image corresponding to each local detector. Local detectors whose similarity is relatively high, that is, higher than the predetermined threshold (for example, 0.8), may be combined. A combination manner may be a simple upper left corner alignment and averaging manner, that is, averaging is performed after filtering matrices corresponding to local detectors that need to be combined are aligned along the upper left corner.

According to the scene recognition apparatus in this embodiment of the present invention, local detectors are combined, and a to-be-recognized scene is detected by using a combined local detector, so that an acquired feature of the to-be-recognized scene can completely represent image information, and repeated detection on a part can also be avoided, thereby effectively reducing the number of dimensions of feature information, so that scene recognition performance can be improved.

In this embodiment of the present invention, optionally, the detecting module 620 is configured to acquire a response diagram of the to-be-recognized scene by using each local detector that detects the to-be-recognized scene, divide the response diagram into multiple grids, use a maximum response value in each grid as a feature of each grid, use features of all grids of the response diagram as features corresponding to the response diagram, and use features that correspond to the response diagram and are acquired by all local detectors that detect the to-be-recognized scene as the feature, which is based on the local area of the target, of the to-be-recognized scene.

The recognizing module 630 recognizes the to-be-recognized scene according to the feature, which is based on the local area of the target and acquired by the detecting module 620, of the to-be-recognized scene.

Optionally, the recognizing module 630 is configured to classify the feature, which is based on the local area of the target, of the to-be-recognized scene by using a classifier, and acquire a scene recognition result.

For example, multiple SVM classifiers of a linear kernel function are first trained by using training samples. A new image is given. The recognizing module 630 uses a trained scene classifier to classify a feature, which is based on a local area of a target, of an image scene, and output is a recognition confidence level of a scene corresponding to the classifier, so as to obtain a scene recognition result.

The scene recognition apparatus 600 according to this embodiment of the present invention may correspond to an execution body in the scene recognition method according to the embodiment of the present invention, and the foregoing and other operations and/or functions of the modules in the apparatus 600 are used to implement corresponding procedures of the methods shown in FIG. 1 to FIG. 5. For brevity, details are not described herein again.

According to the scene recognition apparatus in this embodiment of the present invention, a to-be-recognized scene is detected by using a local detector corresponding to a local area of a target, and an acquired feature, which is based on the local area of the target, of the to-be-recognized scene may represent image information more completely; further, local detectors are combined, and the to-be-recognized scene is detected by using a combined local detector, so that the acquired feature of the to-be-recognized scene can completely represent image information, and repeated detection on a part can also be avoided, thereby effectively reducing the number of dimensions of feature information, so that scene recognition performance can be improved.

Figure 8:
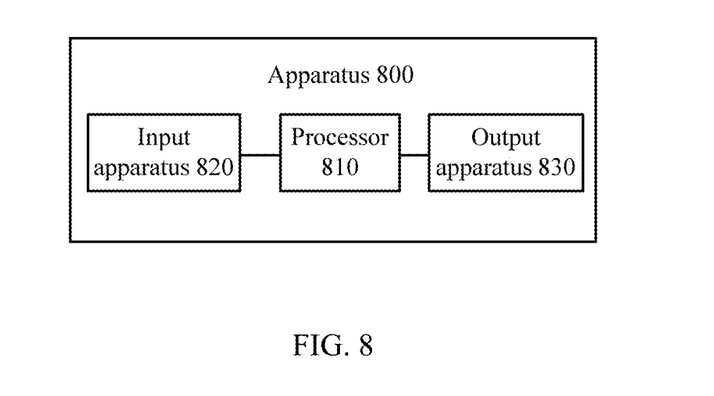
FIG. 8 is a schematic block diagram of a scene recognition apparatus according to another embodiment of the present invention.

FIG. 8 is a schematic block diagram of a scene recognition apparatus 800 according to another embodiment of the present invention. As shown in FIG. 8, the apparatus 800 includes a processor 810, an input apparatus 820, and an output apparatus 830.

The processor 810 obtains multiple local detectors by training a training image set input by the input apparatus 820, where one local detector in the multiple local detectors corresponds to one local area of a type of target, and the type of target includes at least two local areas; detects, by using the multiple local detectors, a to-be-recognized scene input by the input apparatus 820, and acquires a feature, which is based on a local area of the target, of the to-be-recognized scene; and recognizes the to-be-recognized scene according to the feature, which is based on the local area of the target, of the to-be-recognized scene, and outputs a recognition result by using the output apparatus 830.

According to the scene recognition apparatus in this embodiment of the present invention, a to-be-recognized scene is detected by using a local detector corresponding to a local area of a target, and an acquired feature, which is based on the local area of the target, of the to-be-recognized scene may represent image information more completely, so that scene recognition performance can be improved.

Optionally, the processor 810 is further configured to combine local detectors whose similarity is higher than a predetermined threshold in the multiple local detectors, to obtain a set in which local detectors are combined; and detect the to-be-recognized scene by using a local detector in the set in which the local detectors are combined, and acquire the feature, which is based on the local area of the target, of the to-be-recognized scene.

Optionally, the similarity includes a similarity degree between features of local areas of training images corresponding to the multiple local detectors.

According to the scene recognition apparatus in this embodiment of the present invention, local detectors are combined, and a to-be-recognized scene is detected by using a combined local detector, so that an acquired feature of the to-be-recognized scene can completely represent image information, and repeated detection on a part can also be avoided, thereby effectively reducing the number of dimensions of feature information, so that scene recognition performance can be improved.

Optionally, the processor 810 is configured to classify the feature, which is based on the local area of the target, of the to-be-recognized scene by using a classifier, and acquire a scene recognition result.

Optionally, the processor 810 is configured to acquire a response diagram of the to-be-recognized scene by using each local detector that detects the to-be-recognized scene, divide the response diagram into multiple grids, use a maximum response value in each grid as a feature of each grid, use features of all grids of the response diagram as features corresponding to the response diagram, and use features that correspond to the response diagram and are acquired by all local detectors that detect the to-be-recognized scene as the feature, which is based on the local area of the target, of the to-be-recognized scene.

The scene recognition apparatus 800 according to this embodiment of the present invention may correspond to an execution body in the scene recognition method according to the embodiment of the present invention, and the foregoing and other operations and/or functions of the modules in the apparatus 800 are used to implement corresponding procedures of the methods shown in FIG. 1 to FIG. 5. For brevity, details are not described herein again.

According to the scene recognition apparatus in this embodiment of the present invention, a to-be-recognized scene is detected by using a local detector corresponding to a local area of a target, and an acquired feature, which is based on the local area of the target, of the to-be-recognized scene may represent image information more completely; further, local detectors are combined, and the to-be-recognized scene is detected by using a combined local detector, so that the acquired feature of the to-be-recognized scene can completely represent image information, and repeated detection on a part can also be avoided, thereby effectively reducing the number of dimensions of feature information, so that scene recognition performance can be improved.

It should be understood that the term "and/or" in the embodiments of the present invention describes only an association relationship between associated objects and represents that three relationships may exist. For example, A and/or B may represent the following three cases: only A exists, both A and B exist, and only B exists. In addition, the character "/" in this specification generally indicates an "or" relationship between the associated objects.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use a different method to implement the described functions for each particular application, but it should not be considered that such implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely a logical function division and there may be other divisions in actual implementation. For example, multiple units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical or other forms.

The units described as separate parts may or may not be physically separate, and parts displayed as units may or may not be physical units, may be located in one position, or may be distributed on multiple network units. A part or all of the units may be selected according to an actual need to achieve the objectives of the solutions in the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in a form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in a form of a software product. The computer software product is stored in a storage medium and includes several instructions for instructing a computer device (which may be a personal computer, a server, or a network device) to perform all or a part of the steps of the methods described in the embodiments of the present invention. The foregoing storage medium includes any medium that can store program code, such as a universal serial bus (USB) flash drive, a removable hard disk, a read-only memory (ROM), a random access memory (RAM), a magnetic disk, or an optical disc.

The foregoing descriptions are merely specific implementations of the present invention, but are not intended to limit the protection scope of the present invention. Any equivalent variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A scene recognition apparatus, comprising:
a non-transitory computer-readable medium having instructions stored thereon; and
a computer processor coupled to the non-transitory computer-readable medium and configured to execute the instructions to:
obtain multiple local detectors by training a training image set, wherein one local detector in the multiple local detectors corresponds to one local area of a type of target, and wherein the type of target comprises at least two local areas;
detect a to-be-recognized scene by using the multiple local detectors;
acquire a feature, which is based on a local area of the target, of the to-be-recognized scene, wherein the feature is acquired by selecting a maximum response value from a grid of multiple response values; and
recognize the to-be-recognized scene according to the feature, which is based on the local area of the target, of the to-be-recognized scene.

2. The apparatus according to claim 1, wherein the computer processor is configured to execute the instruction to:
combine local detectors whose similarity is higher than a predetermined threshold in the multiple local detectors, to obtain a set in which the local detectors are combined;
detect the to-be-recognized scene by using the multiple local detectors;
acquire the feature, which is based on the local area of the target, of the to-be-recognized scene comprises detecting the to-be-recognized scene by using a local detector in the set in which the local detectors are combined; and
acquire the feature, which is based on the local area of the target, of the to-be-recognized scene.

3. The apparatus according to claim 2, wherein the similarity comprises a similarity degree between features of local areas of training images corresponding to the multiple local detectors.

4. The apparatus according to claim 1, wherein the computer processor is configured to execute the instructions to recognize the to-be-recognized scene according to the feature, which is based on the local area of the target, of the to-be-recognized scene comprises the computer processor being configured to execute the instructions to classify the feature, which is based on the local area of the target, of the to-be-recognized scene by using a classifier, and acquire a scene recognition result.

5. The apparatus according to claim 1, wherein the computer processor is configured to execute the instructions to acquire the feature, which is based on the local area of the target, of the to-be-recognized scene comprises the computer processor being configured to:
acquire a response diagram of the to-be-recognized scene by using each local detector that detects the to-be-recognized scene;
divide the response diagram into multiple grids, using a maximum response value in each grid as a feature of each grid, using features of all grids of the response diagram as features corresponding to the response diagram; and
use features that correspond to the response diagram and are acquired by all local detectors that detect the to-be-recognized scene as the feature, which is based on the local area of the target, of the to-be-recognized scene.

6. A scene recognition apparatus, comprising:
a non-transitory computer-readable medium having instructions stored thereon; and
a computer processor coupled to the non-transitory computer-readable medium and configured to execute the instructions to:
obtain multiple local detectors by training a training image set, wherein one local detector in the multiple local detectors corresponds to one local area of a type of target, and wherein the type of target comprises at least two local areas;
detect a to-be-recognized scene by using the multiple local detectors;
acquire a feature, which is based on a local area of the target, of the to-be-recognized scene;
recognize the to-be-recognized scene according to the feature, which is based on the local area of the target, of the to-be-recognized scene;
combine local detectors whose similarity is higher than a predetermined threshold in the multiple local detectors, to obtain a set in which the local detectors are combined; and
detect the to-be-recognized scene by using a local detector in the set in which the local detectors are combined.

7. The apparatus according to claim 6, wherein the similarity comprises a similarity degree between features of local areas of training images corresponding to the multiple local detectors.

8. The apparatus according to claim 6, wherein the computer processor is configured to execute the instructions to classify the feature, which is based on the local area of the target, of the to-be-recognized scene by using a classifier, and acquire a scene recognition result.

9. The apparatus according to claim 6, wherein the computer processor is configured to execute the instructions to:
acquire a response diagram of the to-be-recognized scene by using each local detector that detects the to-be-recognized scene;
divide the response diagram into multiple grids, use a maximum response value in each grid as a feature of each grid;
use features of all grids of the response diagram as features corresponding to the response diagram; and
use features that correspond to the response diagram and are acquired by all the local detectors that detect the to-be-recognized scene as the feature, which is based on the local area of the target, of the to-be-recognized scene.

10. A scene recognition apparatus, comprising:
a non-transitory computer-readable medium having instructions stored thereon; and
a computer processor coupled to the non-transitory computer-readable medium and configured to execute the instructions to:

obtain multiple local detectors by training a training image set, wherein one local detector in the multiple local detectors corresponds to one local area of a type of target, and wherein the type of target comprises at least two local areas;

detect a to-be-recognized scene by using the multiple local detectors;

acquire a feature, which is based on a local area of the target, of the to-be-recognized scene;

recognize the to-be-recognized scene according to the feature, which is based on the local area of the target, of the to-be-recognized scene;

acquire a response diagram of the to-be-recognized scene by using each local detector that detects the to-be-recognized scene;

divide the response diagram into multiple grids;

use a maximum response value in each grid as a feature of each grid;

use features of all the grids of the response diagram as features corresponding to the response diagram; and use features that correspond to the response diagram and are acquired by all local detectors that detect the to-be-recognized scene as the feature, which is based on the local area of the target, of the to-be-recognized scene.

11. The apparatus according to claim 10, wherein the response diagram is divided into a 1 by 1 grid, a 2 by 2 grid, and a 3 by 1 grid.

12. The apparatus according to claim 10, wherein the computer processor is configured to:

execute the instruction to combine local detectors whose similarity is higher than a predetermined threshold in the multiple local detectors, to obtain a set in which the local detectors are combined;

execute the instructions to detect the to-be-recognized scene by using the multiple local detectors; and acquire the feature, which is based on the local area of the target, of the to-be-recognized scene comprises detecting the to-be-recognized scene by using a local detector in the set in which the local detectors are combined.

13. The apparatus according to claim 12, wherein the local detectors are combined using an upper left corner alignment and averaging manner, wherein averaging is performed after filtering matrices corresponding to the local detectors are combined and aligned along an upper left corner.

* * * * *